United States Patent [19]

Kazama et al.

[11] 4,370,291

[45] Jan. 25, 1983

[54] PROCESS FOR PRODUCING POLYESTER FILM

[75] Inventors: Takahiko Kazama; Yuji Okamura, both of Otsu; Saburo Fujita, Gifu, all of Japan

[73] Assignee: Toray Industries, Inc., Tokyo, Japan

[21] Appl. No.: 304,200

[22] Filed: Sep. 21, 1981

[30] Foreign Application Priority Data

Sep. 25, 1980 [JP] Japan ............................... 55-132345

[51] Int. Cl.³ .......................... B29D 7/02; B29C 17/02
[52] U.S. Cl. ............................. 264/210.7; 264/235.8; 264/290.2
[58] Field of Search ............... 264/210.7, 235.8, 290.2

[56] References Cited

U.S. PATENT DOCUMENTS

3,256,379  6/1966  Heffelfinger .................. 264/210.7
4,237,088  12/1980  Yoshimura ..................... 264/290.2

FOREIGN PATENT DOCUMENTS

53-125479  11/1978  Japan ............................. 264/290.2
54-56674   5/1979   Japan ............................. 264/290.2

Primary Examiner—James B. Lowe
Attorney, Agent, or Firm—Austin R. Miller

[57] ABSTRACT

A biaxially oriented polyester film which is well balanced between sliding properties and transparency and having an enhanced uniformity in thickness is prepared by a process wherein a polyester, predominantly comprised of polyethylene terephthalate, is extruded into a sheet form extrudate; the extrudate is quenched to a temperature of below Tg to obtain a solidified, substantially amorphous film; the film is drawn in the longitudinal direction at a drawing ratio of larger than 2.4 but smaller than 6.5; the film is quenched; and then, the film is drawn in the transverse direction at a drawing ratio of at least 2.5. The drawing in the longitudinal direction is carried out in two steps wherein:

(i) in the first drawing step, the substantially amorphous film is drawn in one or more stages at a total drawing zone length ($l_1$) of at least 50 mm so that the resulting polyester film possesses a birefringence of $1 \times 10^{-3}$ to $12 \times 10^{-3}$;

(ii) the drawn film is kept, without being quenched to a temperature of not higher than the Tg, in contact with a roll maintained at 100° to 130° C.; and then, (iii) in the second drawing step, the film is drawn at a drawing ratio of larger than 1.6 but smaller than 2.7 in one stage at a drawing zone length of shorter than $l_1/2$.

12 Claims, 4 Drawing Figures

PROCESS FOR PRODUCING POLYESTER FILM

BACKGROUND OF THE INVENTION (1) Field of the Invention

This invention relates to a process for producing a polyester film. More particularly, it relates to a process for producing a biaxially drawn polyester film well balanced between sliding properties and transparency and having an enhanced uniformity in thickness from a substantially amorphous film predominantly comprised of polyethylene terephthalate.

(2) Description of the Prior Art

Biaxially oriented polyester films of high strength are usually produced by drawing undrawn polyester films in the longitudinal direction and then drawing the film in the transverse direction and, if required, further drawing the film in the longitudinal direction. As described in, for example, Japanese Laid-open Patent Application No. 54-8672/1979, it is known that the process conditions under which undrawn polyester films are first drawn in the longitudinal direction greatly influence the sliding properties of the resulting biaxially oriented film and the uniformity in thickness thereof. However, biaxially oriented polyester films produced by conventional processes are not completely satisfactory in sliding properties and uniformity in thickness. Furthermore, in the course of producing a high tenacity type polyester film exhibiting an extremely high strength, e.g., an F-5 value (strength at 5% elongation) of 16 kg/mm$^2$ or more, as measured in the longitudinal direction, when the film is drawn again in the longitudinal direction, the film is liable to break and productivity is reduced.

SUMMARY OF THE INVENTION

A primary object of the present invention is to provide a polyester film which does not have the above-mentioned disadvantages and which is well balanced between sliding properties and transparency and has enhanced uniformity in thickness.

Other objects and advantages of the present invention will be apparent from the following description.

In accordance with the present invention, there is provided an improved process for producing a polyester film which comprises melt-extruding a polyester predominantly comprised of polyethylene terephthalate into an extrudate in sheet form; quenching the extrudate to a temperature of below Tg to obtain a solidified, substantially amorphous film; drawing the film in the longitudinal direction at a drawing ratio ($\lambda t$) of more than 2.4 but less than 6.5, quenching the longitudinally drawn film and, then, drawing the quenched film at a drawing ratio of at least 2.5 in the transverse direction. The improved process is characterized in that the drawing in the longitudinal direction is conducted in two steps wherein:

(i) in the first drawing step, the substantially amorphous film is drawn in one or more stages at a total drawing zone length ($l_1$) of at least 50 mm so that the resulting polyester film possesses a birefringence of from $1 \times 10^{-3}$ to $12 \times 10^{-3}$;

(ii) the drawn film is kept, without being quenched to a temperature of not higher than the glass transition temperature, in contact with a roll maintained at a temperature of from 100° to 130° C.; and then, (iii) in the second drawing step, the film is drawn at a drawing ratio ($\lambda_2$) of more than 1.6 but less than 2.7 in one stage at a drawing zone length ($l_2$) of less than $l_1/2$.

DESCRIPTION OF THE PREFERRED EMBODIMENTS

Figure 1:
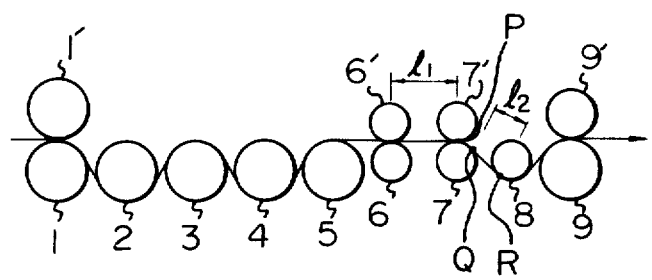
FIG. 1 schematically illustrates an apparatus for drawing a film in the longitudinal direction according to the process of the present invention.

The substantially amorphous polyester film used in the process of the present invention is predominantly comprised of polyethylene terephthalate. By the term "predominantly comprised of polyethylene terephthalate" used herein is meant that the polyester is a polyethylene terephthalate homopolymer or a copolyester, the acid ingredient of which comprises at least 80% by weight of a terephthalic acid residue and the glycol ingredient of which comprises at least 80% by weight of an ethylene glycol residue. If desired, the polyester used may be a polyblend comprised of two or more polyesters, provided that the terephthalic acid residue is contained in an amount of at least 80% by weight based on the total weight of the acid ingredients in the polyblend and the ethylene glycol residue is also contained in an amount of at least 80% by weight based on the total weight of the glycol ingredients therein. The polyester used may have additives incorporated therein during the step of polymerization, such as phosphoric acid, phosphorous acid and their esters and inorganic particles (e.g., silica, kaolin, calcium carbonate, calcium phosphate and titanium dioxide), or additives incorporated therein after polymerization, such as inorganic particles (e.g., those which are listed above).

The substantially amorphous polyester film used may be prepared as follows. The polyester is dried and the dried polyester is melt extruded into a sheet through a die of an extruder maintained, for example, at a temperature of 280° to 290° C. The extruded sheet is cast on a rotating drum whereby the sheet is quenched to a temperature below Tg (i.e., the glass transition temperature) to obtain a solidified film. The obtained film is substantially amorphous, which film is hereinafter referred to as "film A".

The film A is first drawn in the longitudinal direction to an extent such that the resulting polyester film possesses a birefringence ($\Delta n$) of from $1 \times 10^{-3}$ to $12 \times 10^{-3}$, which film is hereinafter referred to as "film B-1". It is preferable that film A is preheated at a temperature of at least 100° C. prior to this first drawing step. Film B-1, having the above-mentioned birefringence, can usually be obtained at a drawing ratio of from about 1.2 to about 3.0, although the suitable drawing ratio varies depending upon the preheating temperature employed.

If film B-1 has a birefringence of below $1.0 \times 10^{-3}$, it is difficult to obtain a film having the intended sliding properties, even if the optimum conditions are employed in the succeeding steps. If film B-1 has a birefringence of more than $12 \times 10^{-3}$, the film is crystallized to an undesirably large extent in the succeeding steps and tends to break often in the step of drawing in the transverse direction, and thus, the production conditions become unstable.

Although the first drawing step may be carried out either in a single stage or in two or more stages, the total drawing zone length ($l_1$) in the first drawing step should be at least 50 mm. Namely, when the first drawing step is carried out in "n" stages ($n \geq 2$) and if the drawing zone length in the i-th stage is expressed in "$l_{1i}$", then the total drawing zone length ($l_1$) should satisfy the following formula.

$$l_1 = \sum_{i=1}^{n} l_{1i} = l_{11} + l_{12} + \ldots + l_{1n} \geq 50 \text{ mm}$$

If the total drawing zone length ($l_1$) is shorter than 50 mm, the finally resulting biaxially oriented film is not balanced between sliding properties and transparency.

When the first drawing step is carried out in n stages, the drawing ratios in the respective n stages are $\lambda_{11}$, $\lambda_{12}$, $-\lambda_{1n}$ and the total drawing ratio ($\lambda_1$) in the first drawing step is the product of these drawing ratios, that is, $$\lambda_1 = \lambda_{11} \times \lambda_{12} \times -\lambda_{1n}$$

The suitable number of stages in the first drawing step varies, depending upon the intended total drawing ratio in this drawing step. Usually, the number of stages is from 1 to 4, preferably from 1 to 3. It is preferable that the starting point for the first drawing be established between a pair of non-sticking nip rolls one of which is a drive roll. The drawing zone length ($l_{1i}$) in each stage in the first drawing step varies, depending upon the particular drawing ratio employed. However, in order to suppress the occurrence of neck-in in the first drawing step below the permissible limit, the drawing zone length ($l_{1i}$) should be not longer than 800 mm, preferably not longer than 600 mm and more preferably not longer than 400 mm. Accordingly, the total drawing length ($l_1$) in the first drawing step should preferably be not longer than 3,200 mm.

Film B-1, i.e., the film longitudinally drawn in the first drawing step, is brought into close contact with a roll maintained at a temperature of from 100° to 130° C., without being quenched, to a temperature of not higher than the glass transition temperature, and the film is kept in the contacted state for a short period of time.

The above-mentioned close contact can be effected, for example, by pressing the film between a pair of non-sticking nip rolls or by electrostatically nipping the film. The surface portion of the roll, with which film B-1 is kept in contact, may be a silicon rubber covering, a teflon covering, a ceramic coating or a roughened hard chrome. The film must be kept in substantially close contact with the roll. However, both side edge portions of the film, each of which portions has a width of about 50 mm, may not be in close contact with the roll, namely, may be slipped on the roll by the drawing force occurring between this contact roll and the chill roll.

If the contact roll is maintained at a surface temperature of below 100° C., it is difficult to obtain a steadily close contact between the film and the contact roll, even if a strong nipping force is applied between the pair of rolls, and consequently, the resulting film becomes non-uniform in thickness. In contrast, if the surface temperature of the contact roll exceeds 130° C., the surface portion of the film is crystallized, with the result of reduction in the contacting force of the film with the roll and a reduction in the transparency of the film.

If the period of time over which film B-1 is kept in contact with the roll is too short, it is difficult to obtain the intended biaxially oriented film which is balanced between sliding properties and transparency and exhibits good uniformity in thickness, as described below, and furthermore, the drawability of the film in the transverse direction becomes poor. In contrast, if the period of contact time is too long, the surface portion of the film is crystallized and hence the drawability in the transverse direction becomes extremely poor. In view of the properties of the resulting biaxially oriented film, it is preferable that the film is kept in contact with the roll over a period of from 0.012 to 1.43 seconds, more preferably from 0.027 to 0.61 second. The optimum contact time is from 0.05 to 0.49.

When film B-1 is kept in contact with the roll maintained at a temperature of from 100° to 130° C. over a short period of time, the degree of crystallinity of the film B-1 does not increase at all. The average degree of crystallinity of film B-1 should preferably be not more than 8% as determined immediately after the roll contact over the entire thickness of the film B-1. By the term "degree of crystallinity" used herein is meant that which is calculated from the following formula.

$$\text{Degree of crystallinity} = \frac{A - 1.33}{B - C} \times 100(\%)$$

wherein,
A: density of film B-1 as determined after roll contact,
B: density of completely crystalline polyester ($= 1.45$ g/cm$^3$)
C: density of completely amorphous polyester ($= 1.33$ g/cm$^3$).

The film leaving the contact roll is then subjected to the second longitudinal drawing. In the second longitudinal drawing step, the film should be drawn at a drawing ratio ($\lambda_2$) of larger than 1.6 but smaller than 2.7 in one stage at a drawing zone length ($l_2$) of less than $l_1/2$. In the case where the drawing zone length ($l_2$) is shorter than $l_1/2$, i.e., $l_2 < (l_1/2)$, as mentioned above, the resulting drawn film exhibits an enhanced uniformity in thickness after the film is quenched to a temperature of below the glass transition temperature ($T_g$) (the quenched film is hereinafter referred to as "film B-2" for brevity). This leads to the enhancement of uniformity in thickness of the finally resulting biaxially oriented film. It is presumed that, when film B-1 (which has been drawn at a relatively long drawing zone length $l_1$) is drawn in the second longitudinally drawing step at a relatively short drawing zone length of below $\frac{1}{2}l_1$, the uneven thickness of film B-1 is uniformly distributed and the degree of non-uniformity in thickness of the film B-1 is reduced.

If the drawing ratio ($\lambda_2$) in the second longitudinal drawing step is not larger than 1.6, the drawing tension is insufficient for enhancing the uniformity in thickness to the desired extent. In contrast, if the drawing ratio ($\lambda_2$) is at least 2.7, the degree of crystallinity increases to an undesirably large extent and it becomes difficult to stably draw the longitudinally drawn film in the transverse direction, although the uniformity in thickness is satisfactory. It is preferable that the drawing ratio ($\lambda_2$) is below 2.3 from a standpoint of stable drawing in the transverse direction.

Furthermore, it is preferable that the drawing zone length ($l_2$) in the second longitudinal drawing step satisfy the two formulae: $l_2 < (l_1/2)$ and $l_2 \leqq 100$ mm. If the drawing zone length ($l_2$) is longer than 100 mm, the degree of uniformity in thickness becomes relatively low and the surface portion of film B-2 tends to be crystallized to some extent resulting in an increase in haze, even when the drawing zone length ($l_2$) is shorter than $l_1/2$. This undesirable phenomenon becomes conspicuous with an increase of the drawing zone length ($l_2$), namely, the area of the film in which the undesirable crystallization occurs expands from both side edge portions toward the central portion. For example, when $l_2$ is 100 mm, the width of the area in which the undesirable crystallization occurs and haze increases is only 30 to 50 mm from the side edges. However, when $l_2$ is 150 mm, the area of the film, in which the undesirable crystallization occurs, expands to the area other than the central ⅓ portion of the entire area of the film.

It is preferable that film B-2 be drawn at a fast speed in the second longitudinally drawing step in order to enhance both the uniformity in thickness and the drawability in the transverse direction. More specifically, the drawing speed v of the film in the second longitudinally drawing step is preferably higher than $5 \times 10^4$%/min., more preferably higher than $1 \times 10^5$%/min. and most preferably higher than $5 \times 10^5$%/min. By the term "drawing speed v" using herein we mean the drawing speed defined by the following formula.

$$v = \frac{V(\lambda^2 - 1) \times 10^4}{2l} \quad (\%/\text{min.})$$

wherein
l: drawing zone length (cm)
V: traveling speed at the inlet of the drawing zone (m/min.)
$\lambda$: drawing ratio The upper limit of the drawing speed v is not particularly limited, but it is preferable that the drawing speed be less than $4 \times 10^6$%/min. in view of the practically acceptable length of the drawing zone.

The product of the drawing ratio $\lambda_1$ in the first longitudinal drawing with the drawing ratio $\lambda_2$ in the second longitudinal drawing should be within the range of larger than 2.4 but smaller than 6.5. If the product of $\lambda_1$ with $\lambda_2$ is not larger than 2.4, there is no significant difference between film B-2 and a conventional film which has been drawn in the longitudinal direction in one stage. In contrast, if the product of $\lambda_1$ with $\lambda_2$ is at least 6.5, thermal crystallization occurs to an undesirably large extent at both side edge portions of the film and the film is subject to slitting in the longitudinal direction, and therefore, it becomes difficult to draw the longitudinally drawn film in the transverse direction.

The longitudinally drawn and then quenched film, i.e., film B-2, is drawn at least 2.5 times its original length in the transverse direction to obtain the intended biaxially oriented film. If a balanced-type biaxially oriented film (that is, a biaxially oriented film which is balanced between the longitudinal strength and the transverse strength) is intended, it is preferable to employ a process wherein the drawing in the longitudinal direction is carried out at a drawing ratio ($\lambda t$) of from 3.6 to 6.5; the drawing in the transverse direction is carried out at a drawing ratio of from 3.0 to 4.0 and at a temperature of from 100° to 140° C.; and the biaxially drawn film is heat-treated at a temperature of 150° to 240° C. If a biaxially oriented film particularly strengthened in the longitudinal direction is intended, it is preferable to employ a process wherein the drawing in the longitudinal direction is carried out at a drawing ratio of from 2.4 to 6.0, more preferably from 3.6 to 5.0; the drawing in the transverse direction is carried out at a drawing ratio of from 2.5 to 3.5 and at a temperature of from 85° to 130° C.; and the biaxially drawn film is again drawn in the longitudinal direction at a drawing ratio of from 1.2 to 3.0 and at a temperature of from 80° to 160° C. and, then, the film is heat-treated at a temperature of from 130° to 240° C.

The biaxially oriented film obtained by the latter process is characterized as exhibiting an enhanced strength, particularly in the longitudinal direction, and being well balanced between sliding properties and transparency.

In order to obtain a biaxially oriented film having well balanced properties between sliding properties, transparency and uniformity in thickness, it is preferable that both the first longitudinal drawing and the second longitudinal drawing are effected at a temperature of from 100° to 150° C. If the drawing temperature is below 100° C., the sliding properties and the transparency are somewhat poor, although the uniformity in thickness is completely satisfactory. In contrast, if the drawing temperature exceeds 150° C., the transparency and the uniformity in thickness becomes poor, although the sliding property is satisfactory. The optimum drawing temperature is in the range of from 105° to 135° C.

The process of the present invention will be described with reference to the apparatuses illustrated in the accompanying drawings. It is to be understood, however, that the process of the present invention is not limited thereby and can be effected by using other apparatuses.

Referring to FIG. 1, a film is supplied between a hard chrome plated roll 1 and a rubber nip roll 1', and travels through silicone rubber-coated pre-heating rolls 2, 3, 4 and 5. A pair of rolls 6 and 6' define the position at which the first longitudinal drawing commences. These rolls, 6 and 6', are coated with a silicone rubber. The pre-heated film is subjected to a first longitudinal drawing between the pair of rolls 6 and 6' and a pair of rolls 7 and 7'. Roll 7 is a mirror-polished ceramic roll, with which the drawn film B-1 is brought into contact. Roll 7' is a silicone rubber-coated nip roll. The first drawing zone length ($l_1$) is the distance between the nip point between rolls 6 and 6' and the nip point between the pair of rolls 7 and 7'. Film B-1, longitudinally drawn in the first drawing zone, is then kept in close contact with roll 7 over the peripheral length spanning from point P on roll 7 (i.e., the nip point between rolls 7 and 7') to point Q on roll 7. Thereafter, film B-1 is again longitudinally drawn in the second drawing zone having the length ($l_2$) spanning from point Q to point R at which the film is brought into contact with a chill roll 8. Rolls 9 and 9' are a chill roll and a rubber nip roll, respectively. The film longitudinally drawn in the second drawing zone is then chilled by these chill rolls 8 and 9. Rolls 2 through 7 are driven by a driving apparatus, not illustrated in FIG. 1. The chilled film is fed to a transverse drawing apparatus (not shown in FIG. 1).

Figure 2:
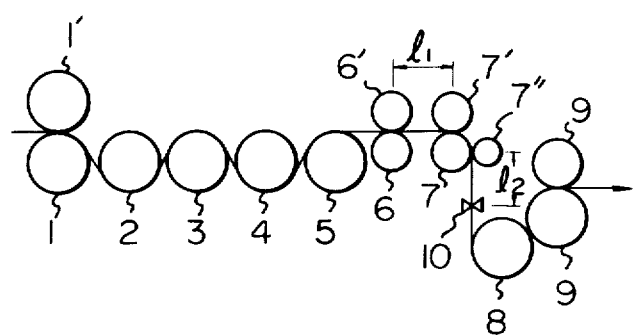
FIGS. 2 and 3 schematically illustrate other apparatuses for drawing a film in the longitudinal direction according to the process of the present invention; and, FIG. 4 is an enlarged cross-sectional view of the roll-contacting zone and the second longitudinal drawing zone of another apparatus for longitudinally drawing a film, which apparatus is similar to the apparatus illustrated in FIG. 1 except that a displaceable roll 8' is provided.

Referring to FIG. 2, wherein another longitudinal drawing apparatus is illustrated, this drawing apparatus is similar to that illustrated in FIG. 1, but the second drawing zone is different from that of FIG. 1. Namely, the film is kept in contact with roll 7 over the peripheral length spanning from the nip point between rolls 7 and 7' to the nip point of rolls 7 and 7". These three rolls 7, 7' and 7" are coated with silicone. Rolls 7' and 7" are disposed vertically and horizontally adjacent to the driving roll 7, respectively. Then, the film is longitudinally drawn in the second drawing zone having the length ($l_2$) spanning from the nip point between rolls 7 and 7" to an air-ejecting nozzle 10. The air-ejecting nozzle is disposed between roll 7 and chill roll 8 so that the second drawing zone length ($l_2$) is shorter than $l_1/2$.

Figure 3:
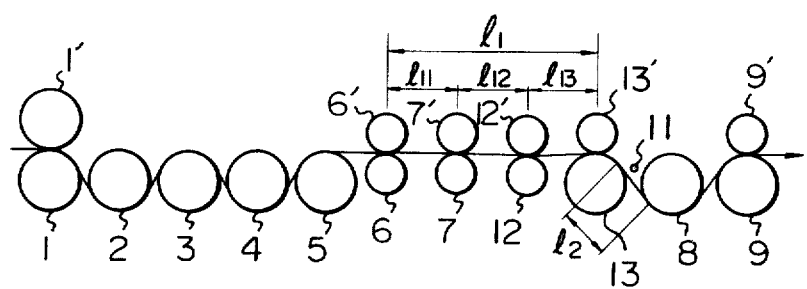

Referring to FIG. 3, wherein still another longitudinal drawing apparatus is illustrated, this drawing apparatus has three first drawing zones which have lengths of $l_{11}$, $l_{12}$ and $l_{13}$, respectively. The total first drawing zone length ($l_1$) in the first drawing step is the sum of these three drawing zone lengths $l_{11}$, $l_{12}$ and $l_{13}$. Rolls 6, 6', 7, 7', 12 and 12' are coated with a silicone rubber. Of these, rolls 6, 7 and 12 are driven by a driving apparatus (not shown in FIG. 3). The second drawing zone length ($l_2$) spans from the point, where the film leaves a silicone rubber-coated roll 13, to the point where the film is brought into contact with a chill roll 8. The film travelling on roll 13 is kept in close contact with roll 13 over the length spanning from the nip point between roll 13 and nip roll 13' to the point where the film leaves roll 13. In order to stabilize the point at which the second drawing commences, an electrostatic charge depositing wire 11 is disposed in close proximity to the point where the film leaves roll 13.

The advantages of the process of the present invention are summarized as follows.

(1) In conventional two stage drawing processes, it has been believed that the first stage drawing should be carried out at a drawing ratio of below that which corresponds to the tensile yield stress at the drawing temperature, in order to minimize the non-uniformity in thickness of the resulting secondary drawn film. In contrast, in the process of the present invention wherein the first stage drawing is followed immediately by the roll-contacting step of a short period of time and the second stage drawing of a short zone length, the first stage drawing can be effected even at a drawing ratio exceeding that which corresponds to the tensile yield stress at the drawing temperature. That is, the non-uniformity in thickness of film B-1 drawn in the first drawing step can be greatly mitigated by the combination of the roll-contacting step with the second drawing step. This advantage cannot be obtained if film B-1, drawn in the first drawing step, is treated in a manner similar to that in the conventional two stage drawing processes, namely, if film B-1 is chilled to a temperature of below the glass transition temperature (Tg); the chilled film is again pre-heated; and then, the pre-heated film is subjected to the second drawing.

(2) The biaxially oriented film obtained by the process of the present invention is well balanced between sliding properties and transparency and exhibits an enhanced uniformity in thickness. This advantage is conspicuous, as compared with conventional films prepared from the same polyester by a single or multi-stage drawing procedure.

(3) A biaxially oriented film particularly strengthened in the longitudinal direction can be produced stably and with a high productivity. Conventional biaxially oriented films particularly strengthened in the longitudinal direction have problems in that the film is liable to break often in the second longitudinal drawing step and productivity is low, in addition to the problems that it is not satisfactory in the balance between sliding properties and transparency and in uniformity in thickness.

(4) A biaxially oriented polyester film having a high strength, that is, an F-5 value (strength at 5% elongation) of at least 30 kg/mm$^2$ can be produced on an industrial scale.

(5) The biaxially oriented film can be taken up at a high speed of at least 80 m/min., more preferably at least 150 m/min. This leads to an increase in productivity.

The invention will be described in the following examples.

EXAMPLE 1

In this example, the dependence of the uniformity in thickness of the film upon the first drawing zone length ($l_1$), the second drawing zone length ($l_2$) and the temperature of the contact roll in the drawing of the longitudinal direction was tested.

The apparatus used for drawing the film in the longitudinal direction was similar to that illustrated in FIG. 1.

The testing conditions were as follows.

| | |
|---|---|
| (i) | Film A: a polyethylene terephthalate homopolymer film of 220 microns in thickness. |
| (ii) | Pre-heating roll temperature: roll 1, 75° C. rolls 2 through 6', 125° C. (surface temperature) |
| (iii) | Drawing ratio and zone length: First longitidinal drawing: $l_1$ = 100 mm, $\lambda_1$ = 2.18 Second longitudinal drawing: $l_2$ (distance between rolls 7 and 8) = varied in the range of 10 mm to 80 mm, $\lambda_2$ = 2.29 Surface temperature of roll 7: 90-150° C. |
| (iv) | Speed of travel Feed speed to roll 1: 10 m/min. Take-off speed from roll 9: 50 m/min. |

The longitudinally drawn films B-2 were tested for their degree of variation in thickness over the length of 3 meters by using an electromicro-thickness meter. The degree of variation was expressed by the following ratings.

| Rating | Degree of variation (%) |
|---|---|
| a | <2 |
| b | 2-3 |
| c | 3-5 |
| d | 5-10 |
| e | 10-20 |
| f | >20 |

The test results are shown in Table I, below.

TABLE I

Dependence of uniformity in thickness upon second drawing conditions

| Surface temperature of roll 7 (°C.) | $2l_2/l_1$ | | | | |
|---|---|---|---|---|---|
| | 0.2 | 0.5 | 0.8 | 1.1 | 1.4 |
| 90 | f | f | f | f | f |
| 100 | d | d | e | f | f |
| 105 | b | d | d | f | f |
| 110 | a | b | b | f | f |
| 115 | a | a | b | e | f |
| 120 | a | b | b | f | f |
| 125 | b | c | c | f | f |
| 130 | d | d | d | f | f |
| 140 | f | f | f | f | f |

As is seen from Table 1, good uniformity in thickness of the film is attained when $2l_2/l_1 < 1$, namely, $l_2 < (l_1/2)$ and the temperature of the contact roll is in the range of from 105° to 125° C.

In the above-mentioned test, the period of time, over which the film was kept in contact with roll 7, varied in the range of from about 0.24 to 0.36 second. This is because the point Q (illustrated in FIG. 1) was displaced although only to a minor extent depending upon the particular drawing conditions employed.

EXAMPLE 2

In this example, the influence of the period of time, over which the film is kept in contact with the heated roll, upon the properties of film B-2 was tested.

Figure 4:
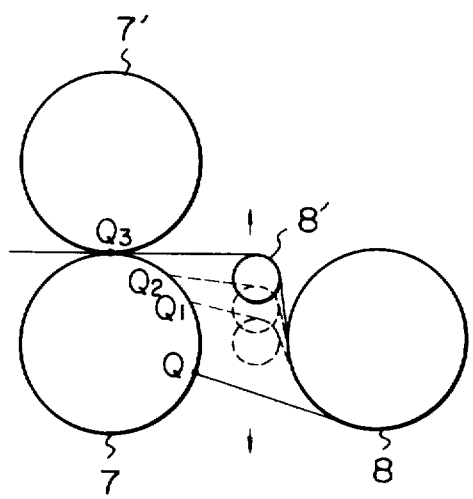

The apparatus used for drawing the film in the longitudinal direction was similar to that illustrated in FIG. 1, but, as illustrated in FIG. 4, a displaceable chill roll 8' of a small diameter was provided between contact roll 7 and roll 8. Chill roll 8' was vertically displaced so that the period of time, over which the film was kept in contact with roll 7, was varied without great change in the drawing zone length between roll 7 and roll 8'. Namely, when chill roll 8' was upward displaced to thrust up the film, the point Q gradually moved upward like $Q_1 \rightarrow Q_2 \rightarrow Q_3$ so that the drawing tension and the adhesion of the film to roll 7 was balanced. When point Q reached the nip point ($Q_3$) of the rolls 7 and 7', the contact time of the film with roll 7 was minimum.

The testing conditions were similar to those employed in Example 1, as follows:

| | |
|---|---|
| (i) | Film A: the same as that of Example 1. |
| (ii) | Pre-heating roll temperature: the same as that of Example 1. |
| (iii) | Drawing ratio and zone length |
| | First longitudinal drawing: the same as those employed in Example 1. |
| | Second longitudinal drawing: $l_2$ = about 40 mm (slightly varied depending upon the other drawing conditions), $\lambda_2$ = 2.29 (i.e., the same as that in Example 1). |

Surface temperature of roll 7: 115° C. The test results are shown in Table II, below.

TABLE II

| Run No. | 1 | 2 | 3 | 4* |
|---|---|---|---|---|
| $2l_2/l_1$ | 0.96 | 0.72 | 0.72 | 0.92 |
| Actual distance of P-Q (mm) | Ca 110 | Ca 50 | Ca 40 | <4 |
| Contact time on roll 7 (sec) | 0.30 | 0.14 | 0.11 | <0.012 |
| Uniformity in thickness of film B-2 | b | a | b | d |

*In the test of run No. 4, according to examination with the naked eye, the film left the roll 7 within less than about 4 mm from the nip point between the rolls 7 and 7', and, accordingly, the contact time was calculated as the contact length being about 4 mm.

As is seen from Table II, when the contact time is below about 0.012 second, the uniformity in thickness of the film B-2 is not satisfactory.

The films B-2, obtained in run Nos. 2 and 4, were drawn in the transverse direction 3.7 times their original length at 120° C. and then, heat-set at 230° C. Properties of the resultant films are shown in Table III, below.

TABLE III

| Run No. | 2 | 4 |
|---|---|---|
| Thickness*[1] (microns) | 12 | 12 |
| Haze*[2] | 1.4 | 2.4 |
| Friction coefficient*[3] (dynamic/static) | 0.65/0.45 | 1.1/0.72 |

*[1] Thickness of the biaxially drawn films
*[2] Determined according to ASTM D-1003
*[3] Determined according to ASTM D-1894

As is seen from Table III, the finally resulting biaxially drawn film is well balanced between haze and sliding properties.

EXAMPLE 3

(1) Chips of polyethylene terephthalate (having an intrinsic viscosity of 0.60 and containing 0.08% by weight of kaolin particles having an average particle size of 2.3 microns incorporated therein in the polymerization step) were dried at 170° C. for 3 hours. The dried chips were melt-extruded at 285° C. through a T-die of an extruder into a sheet. The extruded sheet was cast on a rotating drum, maintained at 30° C., to be solidified into film A having a width of 300 mm and a thickness of 200 microns.

The film A was drawn in the longitudinal direction under the following conditions.

| |
|---|
| First drawing |
| Pre-heating roll temperature (surface temperature): 128° C. |
| $l_1$: 150 mm |
| $\lambda_1$: 2.21 |
| $\Delta n$ of film B-1: $2.7 \times 10^3$ |
| Contacting with roll 7 |
| Surface temperature of roll 7: 116° C. |
| Contact time: 0.18 second |
| Second drawing |
| $l_2$: about 30 mm ($2l_2/l_1$ = about 0.4) |
| $\lambda_2$: 2.29 |

Thereafter, the film was drawn in the transverse direction 3.6 times its original length at 110° C. and then, heat-set at 220° C. for 4 seconds to obtain a biaxially drawn film having a thickness of 11 microns. The take-up speed of the biaxially drawn film was about 90 m/min.

(2) A film A having a width of 300 mm and a thickness of 220 microns, which was similar to the film A mentioned in the preceding item (1), was drawn in the longitudinal direction under the following conditions, i.e., under the conditions disclosed in Example 1 of Japanese Laid-open Patent Application No. 54-8672/79.

| First drawing: | 100° C., 1.5 times |
| Second drawing: | 120° C., 1.06 times |
| Third drawing: | 110° C., 3.5 times |

In the second drawing step, the contact time of the film with the roll was 2.0 seconds.

The longitudinally drawn film was drawn in the transverse direction and then heat-set, in the same manner as that in the preceding item (1), thereby to obtain a biaxialy drawn film having a thickness of 11 microns.

(3) A film A having a width of 300 mm and a thickness of 240 microns was prepared in a manner similar to that in the preceding item (1). The film A was drawn in the longitudinal direction under the following conditions.

First drawing
 Pre-heating roll temperature (surface temperature): 120° C.
 $l_1 = l_{11}$ (150 mm) + $l_{12}$ (150 mm)
 $\lambda_1$: 2.86
 $\Delta n$ of film B-1: 7.1 × 10$^{-3}$
Contacting with roll 7
 Surface temperature of roll 7: 120° C.
 Contact time: about 0.17 second
Second drawing
 $l_2$: about 25 mm ($2l_2/l_1$ = about 0.17)
 $\lambda_2$: 2.1

Thereafter, the film was drawn in the transverse direction under the same conditions as those described in the preceding item (1) and then, heat-set at 220° C. to obtain a biaxially drawn film having a thickness of 11 microns.

The three biaxially oriented films obtained by the procedures mentioned in the preceding items (1), (2) and (3) were tested. The test results are shown in Table IV, below.

TABLE IV

| Run No. | Haze (%) | Friction coefficient (dynamic/static) | Breaking strength*[1] (kg/mm$^2$) | Degree of variation in thickness*[2] (%) |
|---|---|---|---|---|
| (1) | 1.1 | 0.75/0.50 | 27.5 | 3.5 |
| (2) | 1.4 | 1.2/0.95 | 25.9 | 7.2 |
| (3) | 1.2 | 0.80/0.65 | 29.5 | 3.9 |

*[1]Breaking strength as determined in the longitudinal direction according to Japanese Industrial Standard (JIS) C-2318.
*[2]Degree of variation in thickness (A) is expressed by the formula A = (B/C) × 100(%) where B is an absolute value of the thickness variation in the longitudinal direction derived from a thickness chart prepared by determining the thickness over the length of 10 m, and C is the base thickness.

EXAMPLE 4

(1) A film A having a thickness of 350 microns was prepared in a manner similar to that described in item (1) in EXAMPLE 3. The film A was drawn in the longitudinal direction.

First drawing
 Pre-heating roll temperature (surface temperature): 128° C.
 $l_1$: 150 mm
 $\lambda_1$: 2.0
Contacting with roll 7
 Surface temperature of roll 7: 115° C.
 Contact time: about 0.21 second
Second drawing
 $l_2$: about 30 mm ($2l_2/l_1$ = about 0.4)
 $\lambda_2$: 2.25

The longitudinally drawn film B-2 was drawn 3.2 times its original length in the transverse direction at 90° C., and then drawn 2.0 times its original length again in the longitudinal direction at 90° C., and, finally, heat-set at 180° C. to obtain a biaxially drawn and longitudinally strengthened film having a thickness of 12 microns. The take-up speed of the film was 150 m/min.

(2) A film A having a thickness of 230 microns was prepared in a manner similar to that described in item (1) in EXAMPLE 3. The film A was drawn in the longitudinal direction.

First drawing
 Pre-heating roll temperature (surface temperature): 128° C.
 $l_1$: 150 mm
 $\lambda_1$: 1.25
Contacting with roll 7
 Surface temperature of roll 7: 115° C.
 Contact time: about 0.21
Second drawing
 $l_2$: about 30 mm ($2l_2/l_1$ = about 0.4)
 $\lambda_2$: 2.4

The above-mentioned film B-2 was drawn 3.2 times its original length in the transverse direction at 90° C., then, 2.0 times its original length again in the longitudinal direction at 90° C., and finally, heat-set at 180° C. thereby to obtain a biaxially oriented film particularly strengthened in the longitudinal direction and having a thickness of 12 microns. The take-up speed of the film was 150 m/min.

(3) The same film A used in the preceding item (1) of this example was drawn in the longitudinal direction under the same conditions as thosed employed in the preceding item (1) except that the roll-contacting conditions were changed as follows, to obtain a film B-2.

| Surface temperature of roll 7: | 115° C. |
| Contact time: | below 0.012 second |

The film B-2 was drawn 3.2 times its original length in the transverse direction at 90° C., then 1.4 to 2.0 times its original length again in the longitudinal direction at 90° C., and finally, heat-set at 180° C. thereby to obtain a biaxially oriented film particularly strengthened in the longitudinal direction and having a thickness of 12 microns. The take-up speed of the film was 150 m/min.

The three biaxially oriented films obtained by the procedures mentioned in the preceding items (1), (2) and (3) were tested. The test results are shown in Table V, below.

TABLE V

| Run No. | Drawing ratio in second longitudinal drawing | Haze (%) | Frictional coefficient (static/ dynamic) | Degree of variation in thickness in longitudinal direction (%) | F-5 value in longitudinal direction (kg/mm$^2$)*[3] | Productivity*[2] |
|---|---|---|---|---|---|---|
| (1) | 2.0 | 1.0 | 0.85/0.70 | 2.0 | 37.5 | A |
| (2) | 2.0 | 1.2 | 0.77/0.69 | 2.3 | 21.4 | A |
| (3) | 1.4 | 1.4 | 0.77/0.75 | 5.9 | 16.1 | A |
| (Comparative example) | 1.6 | 1.4 | 1.0/0.80 | 5.5 | 16.9 | A |
|  | 1.8 | 1.3 | >1.0/0.90 | 5.3 | 20.2 | B |
|  | 1.9 | 1.3 | >1.0/0.90 | 5.3 | 22.8 | C |
|  | 2.0*[1] | (1.2) | (>1.0/0.95) | (5.0) | 24.1 | D |

*[1] At the drawing ratio of 2.0 in the second longitudinal drawing, the film was liable to break and thus it was difficult to draw it steadily.
*[2] Productivity was expressed by the following four ratings.
A: no break observed in 4 hours
B: no break observed in 2 hours
C: no break observed in 1 hour
D: Often broke
*[3] F-5 value (breaking strength at 5% elongation) was determined in the longitudinal direction according to ASTM D-882.

As is seen from Table V, even when a biaxially oriented film particularly strengthened in the longitudinal direction is produced, the intended film, well balanced between sliding properties and transparency and exhibiting good uniformity in thickness, can be produced by conducting the first longitudinal drawing under the specified conditions employed in the process of the present invention. Furthermore, it will also be seen that the biaxially oriented film particular strengthened in the longitudinal direction can be produced with goood productivity.

We claim:

1. An improvement in a process for producing a polyester film which comprises melt-extruding a polyester predominantly comprised of polyethylene terephthalate into an extrudate in sheet form; quenching the extrudate to a temperature of below Tg to obtain a solidified, substantially amorphous film; drawing the film in the longitudinal direction at a drawing ratio ($\lambda t$) of larger than 2.4 but smaller than 6.5; quenching the longitudinally drawn film and; then, drawing the quenched film at a drawing ratio of at least 2.5 in the transverse direction;

said improvement comprising conducting said drawing in the longitudinal direction in two steps wherein:

(i) in the first drawing step, the substantially amorphous film is drawn in one or more stages at a total drawing zone length ($l_1$) of at least 50 mm so that the resulting polyester film possesses a birefringence of from $1 \times 10^{-3}$ to $12 \times 10^{-3}$;

(ii) the drawn film is kept, without being quenched to a temperature not higher than the glass transition temperature, in contact with a roll maintained at a temperature of from 100° to 130° C.; and then, (iii) in the second drawing step, the film is drawn at a drawing ratio ($\lambda_2$) of larger than 1.6 but smaller than 2.7 in one stage at a drawing zone length ($l_2$) of shorter than $l_1/2$.

2. A process according to claim 1 wherein, in the first drawing step (i), the substantially amorphous film is drawn 1.2 to 3.0 times its original length.

3. A process according to claim 1 wherein said first drawing (i) is carried out in one to four stages.

4. A process according to claim 1 wherein said first drawing (i) is carried out at a temperature of from 100° to 150° C.

5. A process according to claim 1 or 3 wherein the drawing zone length ($l_{1i}$) in each stage in the first drawing step (i) is not longer than 800 mm.

6. A process according to claim 1 wherein, in the step (ii), the drawn film is kept in contact with the roll for a period of from 0.012 to 1.43 seconds.

7. A process according to claim 1 wherein, in the step (ii), the drawn film is kept in contact with the roll for a period of from 0.027 to 0.61 second.

8. A process according to claim 1 wherein the drawing zone length ($l_2$) in the second drawing step (iii) is not longer than 100 mm.

9. A process according to claim 1 wherein, in the second drawing step (iii), the film is drawn at a drawing rate (V) of larger than $5 \times 10^4$%/min.

10. A process according to claim 1 wherein said second drawing (iii) is carried out at a temperature of from 100° to 150° C.

11. A process according to claim 1 wherein said drawing in the longitudinal direction is carried out at a drawing ratio ($\lambda t$) of from 3.6 to 6.5; said drawing in the transverse direction is carried out at a drawing ratio of from 3.0 to 4.0 and at a temperature of from 100° to 140° C.; and the biaxially drawn film is heat-treated at a temperature of 150° to 240° C.

12. A process according to claim 1 wherein said drawing in the longitudinal direction is carried out at a drawing ratio of from 2.4 to 6.0; said drawing in the transverse direction is carried out at a drawing ratio of from 2.5 to 3.5 and at a temperature of from 85° to 130° C.; and the biaxially drawn film is again drawn in the longitudinal direction at a drawing ratio of from 1.2 to 3.0 and at a temperature of from 80° to 160° C. and, then, the film is heat-treated at a temperature of from 130° to 240° C.

* * * * *